US012220935B2

(12) United States Patent
Lasch

(10) Patent No.: US 12,220,935 B2
(45) Date of Patent: Feb. 11, 2025

(54) DECORATIVE FOIL, METHOD FOR PRODUCING A DECORATIVE FOIL AND METHOD FOR DECORATING A TARGET SUBSTRATE

(71) Applicant: LEONHARD KURZ Stiftung & Co. KG, Fürth (DE)

(72) Inventor: Roman Lasch, Fürth (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 99 days.

(21) Appl. No.: 17/780,090

(22) PCT Filed: Nov. 20, 2020

(86) PCT No.: PCT/EP2020/082896

§ 371 (c)(1),
(2) Date: May 26, 2022

(87) PCT Pub. No.: WO2021/110439

PCT Pub. Date: Jun. 10, 2021

(65) Prior Publication Data

US 2022/0410613 A1 Dec. 29, 2022

(30) Foreign Application Priority Data

Dec. 3, 2019 (DE) ......................... 102019132787.3

(51) Int. Cl.
*B42D 25/373* (2014.01)
*B05D 5/06* (2006.01)
(Continued)

(52) U.S. Cl.
CPC ............. *B42D 25/373* (2014.10); *B05D 5/06* (2013.01); *B05D 7/58* (2013.01); *B42D 25/46* (2014.10)

(58) Field of Classification Search
CPC .......... Y10T 428/24975; B42D 25/373; B42D 25/46; B05D 7/58
(Continued)

(56) References Cited

U.S. PATENT DOCUMENTS 5,827,603 A 10/1998 Süss
2008/0286500 A1 11/2008 Sussner et al.
(Continued)

FOREIGN PATENT DOCUMENTS

CA 2 745 913 7/2010
CA 2 745 913 A1 7/2010
(Continued)

OTHER PUBLICATIONS

[NPL-1] Plaia (EP 2172347 A2), Nov. 9, 2009 (EPO—machine translation to English). (Year: 2009).*
(Continued)

*Primary Examiner* — Maria V Ewald
*Assistant Examiner* — Donald M Flores, Jr.
(74) *Attorney, Agent, or Firm* — Hoffmann & Baron, LLP

(57) ABSTRACT

A decorative foil, a method for producing a decorative foil as well as a method for decorating a target substrate. The decorative foil, in particular laminating foil, cold stamping foil or hot stamping foil, includes a carrier film (42) and an all-over varnish layer (41), wherein the carrier film (42) has a thickness in the range of from 3.0 μm to 10.0 μm.

25 Claims, 7 Drawing Sheets

(51) Int. Cl.
*B05D 7/00* (2006.01)
*B42D 25/46* (2014.01)

(58) Field of Classification Search
USPC .......................................................... 428/216
See application file for complete search history.

(56) References Cited

U.S. PATENT DOCUMENTS

| | | | | |
|---|---|---|---|---|
| 2014/0349038 | A1 † | 11/2014 | Pudleiner | |
| 2018/0215190 | A1 | 8/2018 | Reuther | |
| 2018/0272779 | A1 * | 9/2018 | Imakura | B41M 5/50 |
| 2019/0001735 | A1 † | 1/2019 | Cathomen | |
| 2019/0381821 | A1 | 12/2019 | Schmidt et al. | |
| 2020/0361233 | A1 | 11/2020 | Kratzer et al. | |
| 2022/0001662 | A1 | 1/2022 | Hahn | |
| 2022/0048315 | A1 | 2/2022 | Hahn et al. | |

FOREIGN PATENT DOCUMENTS

| | | | | | |
|---|---|---|---|---|---|
| CN | 101049773 | | † | 10/2007 | |
| CN | 101049773 | A | | 10/2007 | |
| CN | 202271680 | U | † | 6/2012 | |
| CN | 104999823 | | † | 10/2015 | |
| CN | 104999823 | A | | 10/2015 | |
| CN | 205364877 | U | † | 7/2016 | |
| CN | 205836293 | U | † | 12/2016 | |
| DE | 202 09 576 | U1 | | 8/2002 | |
| DE | 102 27 430 | A1 | | 1/2004 | |
| DE | 10 2004 017 093 | A1 | | 11/2005 | |
| DE | 10 2008 003 629 | A1 | | 7/2009 | |
| DE | 10 2015 109 642 | A1 | | 12/2016 | |
| DE | 20 2016 105 566 | U1 | | 12/2016 | |
| DE | 10 2015 121 849 | A1 | | 6/2017 | |
| DE | 10 2018 123 473 | A1 | | 3/2020 | |
| DE | 10 2018 128 194 | A1 | | 5/2020 | |
| EP | 2172347 | A2 | * | 4/2010 | B44C 1/1712 |
| JP | 10-505801 | | | 6/1998 | |
| JP | 10-505801 | A | | 6/1998 | |
| JP | 2018-530452 | | | 10/2018 | |
| JP | 2018-530452 | A | | 10/2018 | |
| RU | 2011 129 653 | | | 1/2013 | |
| RU | 2011 129 653 | A | | 1/2013 | |
| TW | 201704010 | | | 2/2017 | |
| TW | 201704010 | A | | 2/2017 | |
| TW | 201706130 | | | 2/2017 | |
| TW | 201706130 | A | | 2/2017 | |
| TW | 201726417 | A | | 8/2017 | |
| TW | 201838822 | | | 11/2018 | |
| TW | 201838822 | A | | 11/2018 | |
| WO | 2013/107777 | A1 | | 7/2013 | |
| WO | 2019/034361 | A2 | | 2/2019 | |

OTHER PUBLICATIONS

[NPL-1] Plaia (EP 2172347 A2); Apr. 7, 2010 (EPO machine translation to English). (Year: 2010).*
Russian Office Action dated Feb. 2, 2024.
Taiwanese Third Party Submission of May 30, 2023.
International Search Report.
German Examination Report.
Taiwanese Office Action of Dec. 19, 2023.
Japanese Office Action dated Sep. 24, 2024.
European Third Party Submission dated Nov. 21, 2024.

* cited by examiner
† cited by third party

DECORATIVE FOIL, METHOD FOR PRODUCING A DECORATIVE FOIL AND METHOD FOR DECORATING A TARGET SUBSTRATE

This application is a National Stage application based on an International Application filed under the Patent Cooperation Treaty, PCT/EP2020/082896, filed Nov. 20, 2020, which claims priority to DE 102019132787.3, filed Dec. 3, 2019.

BACKGROUND OF THE INVENTION

The invention relates to a decorative foil, in particular a laminating foil, hot stamping foil and/or cold stamping foil, a method for producing a decorative foil as well as a method for decorating a target substrate with a decorative foil.

It is known to use decorative foils to apply an all-over varnish layer to security documents for example, such as passports, credit cards or banknotes. In particular, laminating foils, hot stamping foils and/or cold stamping foils are used for this. In the process, an all-over varnish layer of the decorative foil is transferred to a target substrate and then the carrier film of the decorative foil is detached. In the case of such a transfer of the all-over varnish layer of a decorative foil from a carrier film onto a target substrate, the all-over varnish layer is torn along a boundary line which defines the partial region of the all-over varnish layer to be transferred. This partial region can be defined in particular by an adhesive layer applied to the target substrate, which joins the all-over varnish layer to the target substrate. The applied adhesive layer is in particular applied only partially and can for example be designed patterned. Ideally, the decorative foil tears at the outer edge of the adhesive layer. However, depending on the structure and composition of the decorative foil, it can lead for example to undefined tears of the all-over varnish layer away from the outer edge of the adhesive layer, which results in a scruffy decoration.

SUMMARY OF THE INVENTION

The object of the invention is now to specify an improved decorative foil, an improved method for producing a decorative foil as well as an improved method for decorating a target substrate.

The object is achieved by a decorative foil, in particular a laminating foil, cold stamping foil or hot stamping foil, comprising a carrier film and an all-over varnish layer, wherein the carrier film has a thickness in the range of from 3.0 μm to 10.0 μm.

This object is further achieved by a method for producing a decorative foil, wherein the method comprises the following steps, which are carried out in particular in the following sequence:

a) providing a carrier film, wherein the carrier film has a thickness in the range of from 3.0 μm to 10.0 μm,
b) applying an all-over varnish layer to at least one region of at least one surface of the carrier film, wherein a decorative foil is formed.

It is preferably provided that at least one partial region of the at least one region is arranged on at least one surface of the at least one surfaces of the carrier film, wherein it covers at least one surface of the at least one surfaces of the carrier film at least partially.

Furthermore, this object is achieved by a method for decorating a target substrate, wherein the method comprises the following steps, which are carried out in particular in the following sequence:

d) providing a decorative foil,
e) providing a target substrate,
f) applying the decorative foil to at least one region of at least one surface of the target substrate.

It is preferably provided that at least one partial region of the at least one region is arranged on at least one surface of the at least one surfaces of the target substrate, wherein it covers at least one surface of the at least one surfaces of the target substrate at least partially.

It has surprisingly been shown in tests that with the present invention an improved covering power and a cleaner stamping of the decoration is achieved compared with conventional decorative foils, as the cracking force and the tear-off force are reduced because of the reduced carrier film thickness, and these are decisive for a high-quality decoration of the target substrate. When the carrier film is peeled off the all-over varnish layer, the carrier film is bent, with the result that stresses result, in particular over the entire cross section of the decorative foil. Due to the reduced carrier film thickness, these stresses can be reduced and the resulting cracking force and tear-off force are likewise reduced. Further, the fluctuations in the force amplitude of the tear-off force decrease significantly, which further improves the detachment behavior and promotes a clean decoration.

Furthermore, through a decorative foil with a carrier film thickness in the range of from 3.0 μm to 10.0 μm, the amount of plastic waste is reduced compared with conventional decorative foils.

In addition, the advantage further results that longer foil webs can be rolled up with constant foil roll diameter. This is advantageous in particular in terms of logistics and during transport.

Advantageous embodiment examples of the invention are described in the dependent claims.

It is provided in particular that the all-over varnish layer has a thickness in the range of from 1.0 μm to 2.5 μm, in particular of from 1.0 μm to 1.7 μm. It has been shown that in the case of such a layer thickness the all-over varnish layer break particularly well at the predefined edges, which are defined by the outer edge of the adhesive layer. A clean decoration of the decorative foil on the target substrate can thus be achieved.

The ratio of the carrier film thickness to the all-over varnish layer thickness preferably lies in a range of from 1.8:1 to 7.0:1, preferably of from 2.5:1 to 5.8:1, wherein the carrier film has a thickness in a range of from more than or equal to 3 μm to less than or equal to 7 μm and/or the ratio of the carrier film thickness to the all-over varnish layer thickness lies in a range of from 4.1:1 to 10.0:1, preferably of from 4.4:1 to 8.3:1, wherein the carrier film has a thickness in a range of from more than or equal to 7 μm to less than or equal to 10 μm. Such ratios promote a good detachment behavior of the carrier film from the all-over varnish layer. This is because, with such ratios, smaller stresses occur when the carrier film is peeled off the all-over varnish layer than in the case of conventional decorative foils. This also improves the quality of the decoration.

When a decorative foil with the specified ratios of carrier film thickness to all-over varnish layer thickness is used, it has been shown in particular that the stamping quality and the stamping performance are greatly improved compared with decorative foils which have a ratio of the carrier film thickness to the all-over varnish layer thickness outside the specified range.

In particular, the carrier film comprises a material or a combination of materials selected from: PET, PMMA, PC, PE, PVC, PS, ABS, PU, PBS, PLA, PAN and/or glass.

It is provided in particular that the all-over varnish layer has at least one detachment layer and/or at least one protective varnish layer and/or at least one decorative layer and/or at least one primer layer and/or at least one adhesive layer and/or at least one color layer.

At least one detachment layer of the at least one detachment layers preferably comprises a material or a combination of materials selected from: waxes, silicones, polyurethanes and/or polymers, preferably acrylate copolymer, polyester copolymers, polystyrene copolymers, polycarbonate copolymers.

The tear-off force indicates the force which is to be applied in order to detach two layers from each other; there is a positive correlation between the force for tearing a first layer off a second layer and the adhesion between the first and the second layer.

The adhesion of at least one color layer of the at least one color layers to at least one region of the all-over varnish layer of the decorative foil, which have been transferred to a target substrate, was determined immediately after the printing and one day after the printing by means of the following adhesive tape test at room temperature:

A test specimen in the form of a target substrate with the all-over varnish layer applied thereto and a printing of at least one color layer onto at least one region of the all-over varnish layer was arranged in a materials testing machine of the Z005 type from ZwickRoell GmbH & Co. KG. A strip of tesa-brand adhesive tape 13 to 16 cm long of the 4104 type with a width of 19 mm was stuck on the test specimen, so that approximately 5 cm to 7 cm of the adhesive tape protrudes beyond the edge of the substrate. The adhesive tape was then pressed on with a thumb three to four times and finally peeled off the test specimen at a peel angle of 90° at a speed of 500 mm/min and in the process the force which was necessary in order to detach the at least one color layer of the at least one color layers from the all-over varnish layer was measured. The test was regarded as having been passed when 90% of the printing ink remained on the test specimen or the test specimen itself was torn.

Printings on an all-over varnish layer with conventional printing inks, in particular with the UV-curing printing inks, UV-curing varnishes, hybrid inks or hybrid varnishes and/or oxidatively curing printing inks and/or low-migration inks (LMI) already named above, adhered to the transfer ply very well, with the result that the test could be assessed as having been passed very well.

It is preferably provided that the all-over varnish layer has at least one color layer on at least one surface, wherein the adhesive force between at least one color layer of the at least one color layers and the all-over varnish layer is at least 25 cN, preferably at least 30 cN.

At least one detachment layer of the at least one detachment layers preferably has a thickness in the range of from 0.01 μm to 0.50 μm, preferably of from 0.10 μm to 0.30 μm. This comparatively small thickness of the detachment layer allows a sharp-edged and clean detachment of the all-over varnish layer from the carrier film. The accuracy achievable here and the resolution achievable here can correspond comparatively accurately to the layout of the partially applied, preferably to the target substrate, at least one adhesive layer of the at least one adhesive layers, without deviating significantly therefrom, as a result of which a high register accuracy of the foil layout relative to a possibly present print layout consisting of conventional printing inks is achievable.

By register or registration, or register accuracy or registration accuracy, is preferably meant a positional accuracy of two or more elements and/or layers.

The register accuracy is to range within a predefined tolerance which is to be as low as possible. At the same time, the register accuracy of several elements, layers, partial regions relative to each other is an important feature in order to increase the process reliability.

The positionally accurate positioning is effected in particular by means of markings, in particular by means of sensorially, preferably optically detectable registration marks or register marks. These markings, in particular registration marks or register marks, preferably either represent specific separate elements or regions or layers or are preferably themselves part of the elements or regions or layers to be positioned.

During this sharp-edged partial detachment, due to the small thickness of the detachment layer, only very small and very few so-called flakes form, thus small layer residues of the all-over varnish layer of the decorative foil, which can be disruptive in subsequent process steps and/or can disrupt the optical appearance of the coated target substrate. Due to the comparatively small thickness of the detachment layer, resolutions which lie below the resolving power of the human eye are achievable.

In particular, it is advantageous if at least one detachment layer of the at least one detachment layers is formed transparent and/or translucent and/or opaque and/or dyed and/or at least partially dyed and/or crystal clear.

At least one protective varnish layer of the at least one protective varnish layers preferably comprises a material or a combination of materials selected from: polymers, in particular acrylate copolymers, polyester copolymers, polystyrene copolymers, polycarbonate copolymers and/or SMA copolymers (SMA=styrene maleic anhydride).

To achieve a high covering power, it is advantageous in particular if the layers of the all-over varnish layer contain long-chain, in particular high-molecular-weight, polymers. However, to achieve a clean stamping, it is preferably advantageous if the layers of the all-over varnish layer contain short-chain, in particular low-molecular-weight, polymers. In order to combine the two advantages with each other, it is provided in particular that the polymers, in particular acrylate copolymers, polyester copolymers, polycarbonate copolymers, polystyrene copolymers and/or SMA copolymers and/or combinations thereof, of the all-over varnish layer have a molar mass in the range of from 1,000 g/mol to 100,000 g/mol, preferably of from 3,000 g/mol to 35,000 g/mol.

The covering power is a measure of the number of defects in a target substrate decorated with a continuous solid surface. In the case of a 100% covering power, therefore, no defects or holes occur inside this solid surface on the decorated target substrate. The defects can appear microscopically, thus not able to be resolved by the human eye, or macroscopically, thus able to be resolved by the human eye. A low and homogeneous tear-off force makes a high covering power of the decoration possible.

At least one protective varnish layer of the at least one protective varnish layers preferably has a thickness in the range of from 0.5 μm to 3 μm, in particular of from 0.8 μm to 1.3 μm.

The protective varnish layer provides in particular a protection against mechanical and/or chemical stress of the all-over varnish layer on a target substrate.

It is preferably possible for at least one protective varnish layer of the at least one protective varnish layers to be formed transparent and/or translucent and/or opaque and/or dyed and/or at least partially dyed and/or crystal clear.

It is provided in particular that at least one decorative layer of the at least one decorative layers comprises at least one metallic layer and/or at least one dielectric layer.

At least one decorative layer of the at least one decorative layers preferably has a thickness in the range of from 8 nm to 500 nm, preferably of from 8 nm to 60 nm, in particular preferably of from 10 nm to 30 nm. In order, when a UV adhesive is used as cold glue, to achieve the desired high UV transmissibility of the decorative foil also in the case of a decorative layer in the form of a metallic layer, it is particularly preferred if the metallic layer has only a layer thickness in the range of from 8 nm to 60 nm, preferably in the range of from 10 nm to 30 nm. Thus, a good visibility and decorative effect of the metallic layer in combination with a high transmissibility for UV radiation are achieved (OD=optical density, approx. 1.2).

In order to achieve a sufficient curing of a UV adhesive, it is provided in particular that the decorative foil has a transmissibility for UV radiation in the wavelength range of from 250 nm to 400 nm in the range of from 5% to 70%, in particular of from 10% to 40%. A particularly rapid and in particular sufficient curing of a cold glue based on a glue that crosslinks under UV irradiation on the target substrate thereby becomes possible, as a result of which the adhesion of the all-over varnish layer to the target substrate is improved still further. This is because only when the irradiation quantity is high enough is the glue that crosslinks under UV irradiation completely crosslinked and fully cured and achieves a high adhesive force, with the result that a detachment of the all-over varnish layer regions transferred to the target substrate from the target substrate is reliably prevented. A determining factor for the UV transmissibility of a decorative foil here is the layer of a decorative foil which has the lowest UV transmissibility of all layers present.

It is provided in particular that at least one metallic layer of the at least one metallic layers comprises a material or a combination of materials selected from: aluminum, silver, gold, copper, nickel, chromium and/or an alloy comprising at least two of these metals.

At least one dielectric layer of the at least one dielectric layers preferably comprises a material or a combination of materials selected from: metal oxide, polymer, varnish and/or HRI material (HRI=High Refractive Index), in particular MgO, $TiO_n$, $Al_2O_3$, ZnO, ZnS and/or $SiO_n$, wherein the variable n preferably lies in the range of from more than or equal to 0 to less than or equal to 3.

It is provided in particular that at least one decorative layer of the at least one decorative layers is also formed from an HRI material (HRI=High Refractive Index) which is transmissible for radiation in particular at least for partial regions of the spectrum in the UV region, such as CdSe, CeTe, Ge, $HfO_2$, PbTe, Si, Te, TiCl or ZnTe.

It has proved worthwhile if a decorative layer has a diffractive and/or refractive relief structure for generating optically variable effects and/or a macrostructure for generating three-dimensional effects or depth effects. Through diffractive and/or refractive relief structures, which are formed in particular in a transparent varnish layer or replication varnish layer, different optical effects, so-called optically variable effects, can be achieved depending on the viewing angle, such as holograms, three-dimensional representations with kinematic effect dependent on the viewing angle, etc.

In order to improve the visibility of relief structures, these are usually arranged adjoining a strongly reflective metallic layer and/or dielectric HRI layer (HRI=High Refractive Index) with a comparatively high to very high refractive index, in particular consisting of a metal oxide. Such a highly reflective layer is preferably formed over the whole surface or patterned.

It is therefore provided in particular that at least one decorative layer of the at least one decorative layers has at least one replication varnish layer with a surface structure molded into at least one replication varnish layer of the at least one replication varnish layers, in particular selected from: diffractive surface structure, refractive surface structure, lens structure, matte structure and/or blazed grating.

In particular, it is further possible for at least one decorative layer of the at least one decorative layers to have at least one layer generating an optically variable effect.

At least one decorative layer of the at least one decorative layers preferably has at least one reflective layer, in particular at least one reflective layer formed patterned in the form of a first item of information.

It is also preferably possible for at least one decorative layer of the at least one decorative layers to have at least one color layer formed patterned in the form of a second item of information.

In particular, at least one decorative layer of the at least one decorative layers has at least one thin-film layer element for generating a color shift effect dependent on the viewing angle.

Furthermore, it is also preferably provided that at least one decorative layer of the at least one decorative layers with optically variable pigments, luminescent substances, magnetic or electrically conductive substances, a colored varnish layer, a thin-film stack with interference color effect dependent on the viewing angle, a liquid-crystal layer, or also a combination of the above-named layers comprising metallic layers, dielectric layers etc., is designed as at least one decorative layer of the at least one decorative layers.

It is preferably provided that at least one primer layer of the at least one primer layers has a thickness in the range of from 0.1 μm to 2 μm, preferably of from 0.2 μm to 0.8 μm.

In particular, at least one primer layer of the at least one primer layers is formed transparent and/or translucent and/or opaque and/or dyed and/or at least partially dyed and/or crystal clear. In particular if at least one primer layer of the at least one primer layers is formed dyed at least partially or dyed, the contrast to the target substrate is increased and a particularly high-quality optical impression or effect is achieved.

It is further preferably provided that at least one primer layer of the at least one primer layers has a surface roughness in the range of from 100 nm to 200 nm, preferably of from 120 nm to 160 nm. The surface roughness is determined among other things by the method of deposition and the formulation of the primer layer. It has been established that a smaller surface roughness, but surprisingly also a greater surface roughness, of the primer layer leads to a reduction of the adhesion achievable between a cold glue and the transfer ply or all-over varnish layer. The surface roughness of the primer layer was determined by means of an interference microscopy.

In addition, it is possible for example for the all-over varnish layer to comprise several primer layers, which are different in terms of their chemical and/or physical properties, with the result that the optimum adhesion to the adjoining layers is formed. Thus, it is possible for example to achieve, on the one hand, an optimum adhesion towards at least one decorative layer of the at least one decorative layers and, on the other hand, an optimum adhesion towards at least one adhesive layer of the at least one adhesive layers.

In particular, an adhesion of adhesive-tape strength (adhesive tape test, see above) between the transfer ply and the substrate is achieved, wherein, when a conventionally drying cold glue was used, the adhesive tape test could already be assessed as having been passed after a few minutes and, when a UV adhesive was used, the adhesive tape test could be assessed as having been passed immediately after the irradiation with UV light. More than 90% of the transfer ply remained on the target substrate.

It is provided in particular that at least one adhesive layer of the at least one adhesive layers covers at least one first region of the all-over varnish layer at least partially or over the whole surface.

At least one adhesive layer of the at least one adhesive layers preferably does not cover at least one second region of the all-over varnish layer, in particular wherein at least one second region of the at least one second regions does not overlap at least one first region of the at least one first regions or overlaps it at least partially or over the whole surface.

It is preferably provided that at least one first region of the at least one first regions and/or at least one second region of the at least one second regions comprises at least one of the following design elements or a combination of the following design elements: alphanumeric character, character, symbol, microprint, image, photo, logo, portrait, pictogram, pattern, in particular endless pattern, grid, in particular periodic grid, amplitude-modulated grid, dot grid, line grid, motif.

It is preferably also possible for at least one adhesive layer of the at least one adhesive layers to be formed of a hot glue and/or a thermoplastic adhesive and/or a cold glue and/or a radiation-curable adhesive, in particular an adhesive that can be cured by means of electromagnetic radiation and/or electron beam radiation and/or by means of UV radiation, and/or an oxidatively curing adhesive and/or a low-migration adhesive (LMI adhesives, LMI=low migration ink).

As already set out in the state of the art, the all-over varnish layer ideally tears at the outer edge, in particular at the front edge in the feed direction, of at least one adhesive layer of the at least one adhesive layers. The force which has to be applied to crack the all-over varnish layer is called the cracking force. The force which has to be applied to tear the all-over varnish layer at the back edge, in the feed direction, of at least one adhesive layer of the at least one adhesive layers is called the tearing force.

After the all-over varnish layer has been torn or broken at the predefined points, the decoration of the desired surface area is then effected by detaching the all-over varnish layer from the carrier film. The force required for this is called the tear-off force. The tear-off force is thus the force which is required in order to separate the all-over varnish layer from the carrier film or, analogously to this, to separate the carrier film from the all-over varnish layer adhering to at least one adhesive layer of the at least one adhesive layers. A low and homogeneous tear-off force over the entire surface area or region to be decorated makes a high covering power and a clean stamping possible.

As a result, it is provided in particular that the force for tearing the all-over varnish layer off the carrier film lies in a range of from 2 cN to 8 cN.

As a rule, the tear-off force is constant on average, but irregularities in the layer structure of the all-over varnish layer can lead to fluctuations in the tear-off force. It is necessary to keep these fluctuations in the force amplitude of the tear-off force as small as possible, so that it can be said that there is a homogeneous tear-off force and a high covering power can be achieved. For this reason, it is expedient in particular if the tear-off force has fluctuations in the force amplitude around its average in a range of from more than or equal to −0.5 cN to less than or equal to 0.5 cN.

Further, the quality of the decoration can be improved by a low and homogeneous tear-off force. Point perception is also mentioned here. The point perception is preferably an indicator of a pinpoint foil decoration for individually applied adhesive dots. Pinpoint means in this connection that the decoration covers the entire adhesive dot and does not protrude beyond the adhesive dot. As a result, it is preferred if the all-over varnish layer has a covering power of more than or equal to 99.5%, preferably of 100%, in the case of a decoration of a continuous solid surface and a decoration or point perception of more than or equal to 99.5%, preferably of 100%, in the case of a decoration of a 10% halftone area. In the case of a 10% halftone area, an arbitrary surface area of a target substrate is provided with adhesive dots such that 10% of the arbitrary surface area of the target substrate is covered with adhesive dots. The adhesive dots are preferably arranged equidistant, patterned, gridded and/or spaced apart from each other.

For the method for producing a decorative foil, it is provided in particular that the ratio of the thickness of the carrier film to the thickness of the all-over varnish layer lies in a range of from 1.8:1 to 7.0:1, preferably of from 2.5:1 to 5.8:1, wherein the carrier film has a thickness in a range of from more than or equal to 3 μm to less than or equal to 7 μm and/or that the ratio of the thickness of the carrier film to the thickness of the all-over varnish lies in a range of from 4.1:1 to 10.0:1, preferably of from 4.4:1 to 8.3:1, wherein the carrier film has a thickness in a range of from more than or equal to 7 μm to less than or equal to 10 μm.

Further, it is preferably possible for the all-over varnish layer in step b) to have a thickness in the range of from 1.0 μm to 2.5 μm, preferably of from 1.0 μm to 1.7 μm.

Further, it is preferably provided that the all-over varnish layer in step b) has at least one detachment layer and/or at least one protective varnish layer and/or at least one decorative layer and/or at least one primer layer and/or at least one adhesive layer and/or at least one color layer.

In step b) at least one detachment layer of the at least one detachment layers and/or at least one protective varnish layer of the at least one protective varnish layers and/or at least one decorative layer of the at least one decorative layers and/or at least one primer layer of the at least one primer layers and/or at least one adhesive layer of the at least one adhesive layers and/or at least one color layer of the at least one color layers is preferably applied by means of gravure printing and/or screen printing and/or relief printing and/or pad printing and/or inkjet printing and/or offset printing and/or flexographic printing and/or casting techniques.

Further, it is preferably provided that in step b) the at least one adhesive layer is applied as a hot glue, a thermoplastic adhesive, a cold glue, a radiation-curable adhesive, in particular an adhesive that can be cured by means of electromagnetic radiation and/or electron beam radiation and/or by means of UV radiation, or an oxidatively curing adhesive and/or a low-migration adhesive.

It is possible in particular for step b) further to comprise the following step and/or for the following step further to be carried out after step b):

c) applying at least one adhesive layer of the at least one adhesive layers such that at least one adhesive layer of the at least one adhesive layers covers at least one first region of the all-over varnish layer at least partially or over the whole surface and/or does not cover a second region of the all-over varnish layer, in particular wherein at least one second region of the at least one second regions does not overlap at least one first region of the at least one first regions or overlaps it at least partially or over the whole surface.

For example, the regions not covered with the adhesive layer are then not decorated by the decorative foil. Thus, for example, negative fonts and/or negative patterns can be generated.

In particular, at least one first region of the at least one first regions and/or at least one second region of the at least one second regions comprises at least one of the following design elements or a combination of the following design elements: alphanumeric character, character, symbol, microprint, image, photo, logo, portrait, pictogram, pattern, in particular endless pattern, grid, in particular periodic grid, amplitude-modulated grid, dot grid, line grid, motif.

With respect to the method for decorating a target substrate, it is preferred if the method comprises the following steps, which are carried out in particular in the following sequence:

d) providing a decorative foil,
e) providing a target substrate,
f) applying the decorative foil to the target substrate.

Further, it is provided in particular that the following step is carried out before step f):

g) applying at least one adhesive layer to the decorative foil such that at least one adhesive layer of the at least one adhesive layers covers at least one first region of the all-over varnish layer at least partially or over the whole surface and/or does not cover at least one second region of the all-over varnish layer, in particular wherein at least one second region of the at least one second regions does not overlap at least one first region of the at least one first regions or overlaps it at least partially or over the whole surface, and/or applying at least one adhesive layer to the target substrate such that at least one adhesive layer of the at least one adhesive layers covers at least one third region of the target substrate at least partially or over the whole surface and/or does not cover at least one fourth region of the target substrate, in particular wherein at least one fourth region of the at least one fourth regions does not overlap at least one third region of the at least one third regions or overlaps it at least partially or over the whole surface.

The first and second regions are preferably located in a plane spanned by the all-over varnish layer. It is provided in particular that the spanned plane comprises at least one surface of the all-over varnish layer. The third and fourth regions are preferably located in a plane spanned by the target substrate. It is provided in particular that the spanned plane comprises at least one surface of the target substrate.

The first and second regions can preferably be arranged next to each other, spaced apart next to each other, partially overlapping each other and/or overlapping each other over the whole surface. Furthermore, it is also provided in particular that the third and fourth regions are arranged next to each other, spaced apart next to each other, partially overlapping each other and/or overlapping each other over the whole surface.

Further, it is provided in particular that at least one first and/or third region of the at least one first and/or third regions and/or at least one second and/or fourth region of the at least one second and/or fourth regions comprises at least one of the following design elements or a combination of the following design elements: alphanumeric character, character, symbol, microprint, image, photo, logo, portrait, pictogram, pattern, in particular endless pattern, grid, in particular periodic grid, amplitude-modulated grid, dot grid, line grid, motif.

At least one adhesive layer of the at least one adhesive layers in step g) is preferably formed of a hot glue, a thermoplastic adhesive, a cold glue, a radiation-curable adhesive, in particular an adhesive that can be cured by means of electromagnetic radiation and/or electron beam radiation and/or by means of UV radiation, and/or an oxidatively curing adhesive and/or a low-migration adhesive.

In step g) at least one adhesive layer of the at least one adhesive layers is preferably applied by means of gravure printing and/or screen printing and/or relief printing and/or pad printing and/or inkjet printing and/or offset printing and/or flexographic printing and/or casting techniques.

It is possible in particular for at least one first and/or third region of the at least one first and/or third regions to be decorated by the all-over varnish layer and/or for at least one second and/or fourth region of the at least one second and/or fourth regions not to be decorated by the all-over varnish layer.

Further, it is preferably possible for at least one first and/or third region of the at least one first and/or third regions, which is covered by the at least one adhesive layer of the at least one adhesive layers at least partially or over the whole surface, to be decorated by the all-over varnish layer.

It is advantageously preferably possible for at least one color layer to be applied to at least one surface of the all-over varnish layer after step f), with the result that the adhesive force between at least one color layer of the at least one color layers and the all-over varnish layer is at least 25 cN, preferably of at least 30 cN.

It is preferably provided that the all-over varnish layer after step f) has a covering power of more than or equal to 99.5%, preferably of 100%, in the case of decoration of a continuous solid surface and a decoration or point perception of more than or equal to 99.5%, preferably of 100%, in the case of decoration of a 10% halftone area.

Further, it is provided in particular that the following step is further carried out after step f):

peeling the carrier film off the all-over varnish layer, wherein the peel angle between the carrier film and the all-over varnish layer lies in a range of from 0° to 120°, preferably of from 0° to 90°.

In particular, it is possible for the following step further to be carried out in step f) and/or after step f):

h) pressing on the decorative foil with at least one pressure stamp and/or at least one pressure roller.

Furthermore, it is preferably provided that at least one pressure stamp of the at least one pressure stamps and/or at least one pressure roller of the at least one pressure rollers in step h) is designed as a heated planar and/or forming stamp and/or a heated roller, wherein this activates at least one adhesive layer of the at least one adhesive layers at least partially and/or in at least one first and/or third region of the at least one first and/or third regions and joins the decorative foil to the target substrate.

BRIEF DESCRIPTION OF THE DRAWINGS

In the following the invention is explained by way of example with reference to several embodiment examples utilizing the attached drawings. The embodiment examples shown are therefore not to be understood as limitative.

FIG. 11*a* shows a schematic representation of a decorative foil with a carrier film thickness of 5.7 μm, wherein a neutral fiber is drawn in FIG. 11*b* shows a schematic representation of a decorative foil with a carrier film thickness of 12 μm, wherein a neutral fiber is drawn in

DETAILED DESCRIPTION

Figure 1:
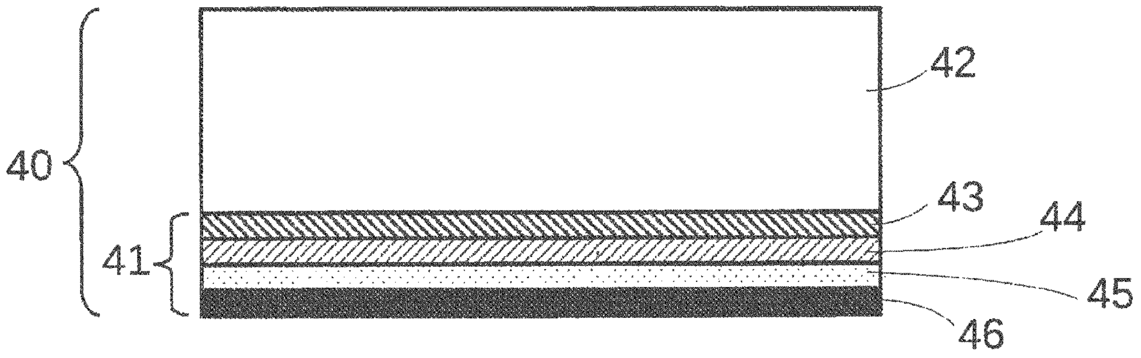
FIG. 1 shows a sectional representation of a decorative foil

FIG. 1 shows a sectional representation of a decorative foil 40, in particular a laminating foil, cold stamping foil or hot stamping foil, comprising a carrier film 42 and an all-over varnish layer 41, wherein the carrier film has a thickness in the range of from 3.0 μm to 10.0 μm.

It is possible in particular for the all-over varnish layer 41 to have a thickness in the range of from 1.0 μm to 2.5 μm, in particular of from 1.0 μm to 1.7 μm.

In this embodiment variant the all-over varnish layer 41 comprises a detachment layer 43, a protective varnish layer 44, a decorative layer 45 and a primer layer 46. In an alternative embodiment variant it is preferably provided that the all-over varnish layer 41 has at least one detachment layer 43 and/or at least one protective varnish layer 44 and/or at least one decorative layer 45 and/or at least one primer layer 46 and/or at least one adhesive layer 47 and/or at least one color layer.

It is preferred that the ratio of the carrier film thickness to the all-over varnish layer thickness lies in a range of from 1.8:1 to 7.0:1, preferably of from 2.5:1 to 5.8:1, wherein the carrier film 42 has a thickness in a range of from more than or equal to 3 μm to less than or equal to 7 μm and/or that the ratio of the carrier film thickness to the all-over varnish layer thickness in a range of from 4.1:1 to 10.0:1, preferably of from 4.4:1 to 8.3:1, wherein the carrier film 42 has a thickness in a range of from more than or equal to 7 μm to less than or equal to 10 μm.

It is advantageous in particular if the decorative foil 40 has a transmissibility for UV radiation in the wavelength range of from 250 nm to 400 nm in the range of from 5% to 70%, in particular of from 10% to 40%.

The carrier film 42 preferably comprises a material or a combination of materials selected from: PET, PMMA, PC, PE, PVC, PS, ABS, PU, PBS, PLA, PAN and/or glass.

At least one detachment layer 43 of the at least one detachment layers 43 preferably has a thickness in the range of from 0.01 μm to 0.50 μm, preferably of from 0.10 μm to 0.30 μm.

At least one detachment layer 43 of the at least one detachment layers 43 preferably comprises a material or a combination of materials selected from: waxes, silicones, polyurethanes and/or polymers, preferably acrylate copolymer, polyester copolymer, polycarbonate copolymer, polystyrene copolymer.

At least one detachment layer 43 of the at least one detachment layers 43 is preferably formed transparent and/or translucent and/or opaque and/or dyed and/or at least partially dyed and/or crystal clear.

The protective varnish layer 44 is an optional layer which serves in particular to protect the decorative layer 45 from mechanical and/or chemical stress. The protective varnish layer 44 is in particular a varnish layer based on nitrocellulose and acrylate polymers, polyester copolymer, polycarbonate copolymer, polystyrene copolymer and/or SMA copolymers.

At least one protective varnish layer 44 of the at least one protective varnish layers 44 preferably has a thickness in the range of from 0.5 μm to 3 μm, in particular of from 0.8 μm to 1.3 μm.

At least one protective varnish layer 44 of the at least one protective varnish layers 44 is preferably formed transparent and/or translucent and/or opaque and/or dyed and/or at least partially dyed and/or crystal clear.

It is preferably possible for at least one protective varnish layer 44 of the at least one protective varnish layers 44 to comprise a material or a combination of materials selected from: polymers, in particular acrylate copolymers, polyester copolymers, polystyrene copolymers, polycarbonate copolymers and/or SMA copolymers.

The polymers, in particular acrylate copolymers and/or SMA copolymers, polyester copolymer, polycarbonate copolymer, polystyrene copolymer or combinations thereof, of the all-over varnish layer 41 preferably have a molar mass in the range of from 1,000 g/mol to 100,000 g/mol, preferably of from 3,000 g/mol to 35,000 g/mol.

It is provided that at least one decorative layer 45 of the at least one decorative layers 45 comprises at least one metallic layer and/or at least one dielectric layer.

Further, it is provided in particular that at least one metallic layer of the at least one metallic layers comprises a material or a combination of materials selected from: aluminum, silver, gold, copper, nickel, chromium and/or an alloy comprising at least two of these metals.

It is preferably possible for at least one dielectric layer of the at least one dielectric layers to comprise a material or a combination of materials selected from: metal oxide, polymer, varnish and/or HRI material, in particular MgO, $TiO_n$, $Al_2O_3$, ZnO, ZnS and/or $SiO_n$, wherein the variable n preferably lies in the range of from more than or equal to 0 to less than or equal to 3.

It is preferably provided that at least one decorative layer 45 of the at least one decorative layers 45 has a thickness in the range of from 8 nm to 500 nm, preferably of from 8 nm to 60 nm, in particular preferably of from 10 nm to 30 nm. In particular, at least one metallic layer of the at least one metallic layers has a thickness in the range of from 8 nm to 60 nm, preferably of from 10 nm to 30 nm. This layer thickness guarantees that a high level of transmissibility for UV radiation is achieved for at least one metallic layer of the at least one metallic layers. This is of interest in particular when a cold glue and/or an adhesive that can be cured by means of electromagnetic radiation, particularly preferably an adhesive that can be cured by means of UV radiation, is used, as it can thus be guaranteed that the UV radiation of a light source emitting UV radiation penetrates in particular at least one metallic layer of the at least one metallic layers and thus the UV adhesive located underneath can be cured. At the same time, a good visibility and decorative effect of at least one metallic layer of the at least one metallic layers is achieved.

In particular, it is possible for at least one decorative layer 45 of the at least one decorative layers 45 to have at least one layer generating an optically variable effect. Particularly high-quality optical properties of the decorative foil 40 can thereby be achieved. Furthermore, it is possible for these to be security elements which are preferably forgery-proof.

Furthermore, it is preferred that at least one decorative layer 45 of the at least one decorative layers 45 has at least one replication varnish layer with a surface structure molded into at least one replication varnish layer of the at least one replication varnish layers, in particular selected from: diffractive surface structure, refractive surface structure, lens structure, matte structure and/or blazed grating.

In particular, it is advantageous if at least one decorative layer 45 of the at least one decorative layers 45 has at least one reflective layer, in particular has at least one reflective layer formed patterned in the form of a first item of information.

It is further preferably provided that at least one decorative layer 45 of the at least one decorative layers 45 has at least one color layer formed patterned in the form of a second item of information.

It is possible in particular for at least one decorative layer 45 of the at least one decorative layers 45 to have at least one thin-film layer element for generating a color shift effect dependent on the viewing angle.

Further, it is provided in particular that at least one primer layer 46 of the at least one primer layers 46 has a thickness in the range of from 0.1 μm to 2 μm, in particular preferably of from 0.2 μm to 0.8 μm.

It is preferably possible for at least one primer layer 46 of the at least one primer layers 46 to be formed transparent and/or translucent and/or opaque and/or dyed and/or at least partially dyed and/or crystal clear. In particular if at least one primer layer 46 of the at least one primer layers 46 is dyed at least partially and/or dyed, the advantage results that the contrast to the target substrate 10 is increased and this achieves a particularly high-quality optical impression or effect.

It is preferred that at least one primer layer 46 of the at least one primer layers 46 has a surface roughness in the range of from 100 nm to 200 nm, preferably of from 120 nm to 160 nm.

In addition, it is possible for example for the all-over varnish layer 41 to comprise several primer layers 46, which are different in terms of their chemical and/or physical properties, with the result that the optimum adhesion to the adjoining layers is formed. Thus, it is possible for example to achieve, on the one hand, an optimum adhesion towards at least one decorative layer 45 of the at least one decorative layers 45 and, on the other hand, an optimum adhesion towards at least one adhesive layer 47 of the at least one adhesive layers 47.

Figure 2:
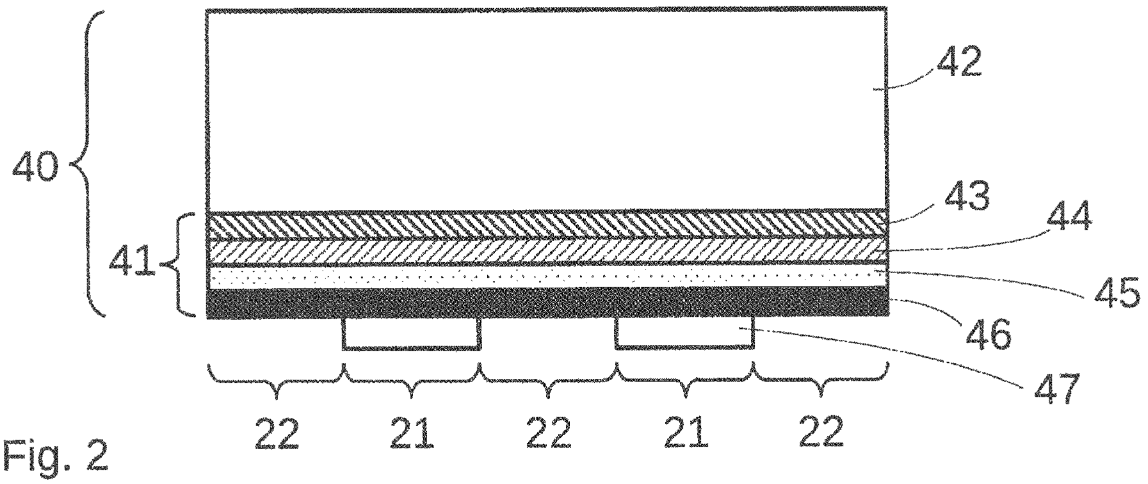
FIG. 2 shows a further sectional representation of a decorative foil

The decorative foil 40 is represented in FIG. 2 with the same structure as shown in FIG. 1, except that an adhesive layer 47 covers a surface of the all-over varnish layer 41 in the first regions 21 and does not cover it in the second regions 22.

It is provided in particular that at least one adhesive layer 47 of the at least one adhesive layers 47 covers at least one first region 21 of the all-over varnish layer 41 at least partially or over the whole surface.

It is furthermore also provided that at least one adhesive layer 47 of the at least one adhesive layers 47 does not cover at least one second region 22 of the all-over varnish layer 41, in particular wherein at least one second region 22 of the at least one second regions 22 does not overlap at least one first region 21 of the at least one first regions 21 or overlaps it at least partially or over the whole surface.

In particular, it is possible for at least one first region 21 of the at least one first regions 21 and/or at least one second region 22 of the at least one second regions 22 to comprise at least one of the following design elements or a combination of the following design elements: alphanumeric character, character, symbol, microprint, image, photo, logo, portrait, pictogram, pattern, in particular endless pattern, grid, in particular periodic grid, amplitude-modulated grid, dot grid, line grid, motif. Individual design possibilities can thus be implemented which produce a particularly high-quality impression for the observer.

Further, it is preferably possible for at least one adhesive layer 47 of the at least one adhesive layers 47 to be formed of a hot glue and/or a thermoplastic adhesive and/or a cold glue and/or a radiation-curable adhesive, in particular an adhesive that can be cured by means of electromagnetic radiation and/or electron beam radiation and/or by means of UV radiation, and/or an oxidatively curing adhesive and/or a low-migration adhesive. The decorative foil 40 can hereby be applied to the target substrate 10 by means of cold stamping for example when a cold glue and/or an adhesive that can be cured by means of UV radiation is used or applied to the target substrate by means of hot stamping for example when a thermoplastic adhesive is used, by activating the at least one adhesive layer 47 of the at least one adhesive layers 47, which comprises a thermoplastic adhesive, by means of a heated pressure stamp and/or a pressure roller.

Figure 3:
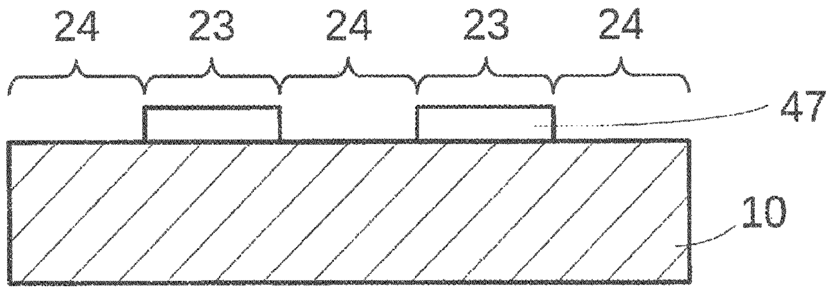
FIG. 3 shows a sectional representation of a target substrate, wherein at least one adhesive layer is applied to the target substrate

A sectional representation of the target substrate 10 is represented in FIG. 3, wherein a surface of the target substrate 10 is covered with at least one adhesive layer 47 in the third regions 23 and not covered in the fourth regions 24. It is provided in particular that, before the application of the decorative foil 40 to the target substrate 10, at least one adhesive layer 47 of the at least one adhesive layers 47 is deposited in at least one third region 23 of the at least one third regions 23 and is not deposited in a fourth region 24 of the at least one fourth regions 24.

It is also possible for at least one adhesive layer 47 of the at least one adhesive layers 47 to cover at least one surface of the target substrate 10 over the whole surface.

Figure 4:
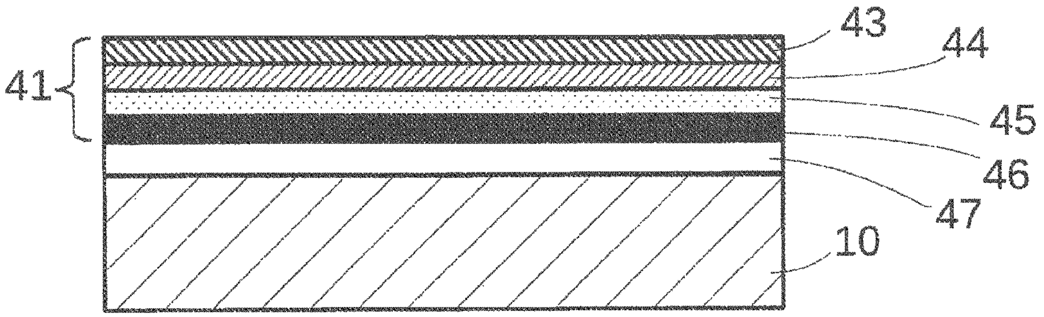
FIG. 4 shows a sectional representation of a decorated target substrate

For this embodiment variant, a sectional representation of a decorated target substrate is represented in FIG. 4. In particular, at least one adhesive layer 47 of the at least one adhesive layers 47 is arranged on a target substrate 10 such that it covers a surface of the target substrate 10 over the whole surface. Further, the decorated target substrate comprises an all-over varnish layer 41 of the decorative foil 40, wherein the carrier 42 has already been peeled off the decorative foil 40. It can preferably also be provided that the carrier 42 remains on the decorative foil 40.

In the embodiment shown the detachment layer 43 is also transferred to the target substrate 10 and does not remain or only partially remains on the carrier film 42. In an alternative embodiment, not represented in more detail, it is also possible for the detachment layer 43 to remain on the peeled-off carrier film 42 or for only very few regions of the detachment layer 43 to also be transferred to the target substrate 10.

Figure 5:
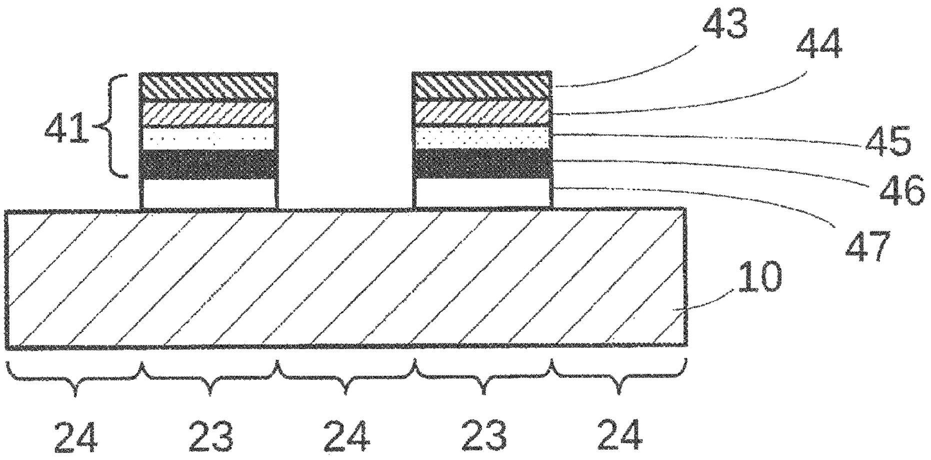
FIG. 5 shows a further sectional representation of a decorated target substrate

A sectional representation of a further alternative for a decorated target substrate is shown in FIG. 5. Here, at least one third region 23 of the at least one third regions 23 is decorated by the all-over varnish layer 41 and at least one fourth region 24 of the at least one fourth regions 24 is not decorated by the all-over varnish layer 41.

However, it is also possible for at least one first and/or third region 21, 23 of the at least one first and/or third regions 21, 23 to be decorated by the all-over varnish layer 41 and/or at least one second and/or fourth region 22, 24 of the at least one second and/or fourth regions 22, 24 not to be decorated by the all-over varnish layer 41.

It is provided in particular that the all-over varnish layer 41 has at least one color layer on at least one surface, wherein the adhesive force between at least one color layer of the at least one color layers and the all-over varnish layer 41 is at least 25 cN, preferably at least 30 cN.

Figure 6:
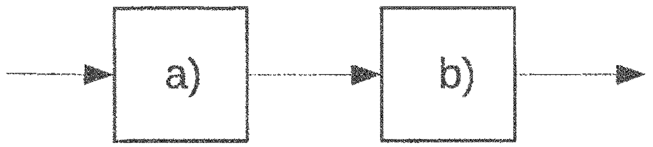
FIG. 6 shows a schematic representation of a method for producing a decorative foil

A schematic representation of a method for producing a decorative foil 40 is shown in FIG. 6, wherein the method comprises the following steps, which are carried out in particular in the following sequence:

a) providing a carrier film 42, wherein the carrier film 42 has a thickness in the range of from 3.0 μm to 10.0 μm, b) applying an all-over varnish layer 41 to at least one region of at least one surface of the carrier film 42, wherein a decorative foil 40 is formed.

It is preferably possible for the all-over varnish layer 41 in step b) to have a thickness in the range of from 1.0 μm to 2.5 μm, preferably of from 1.0 μm to 1.7 μm.

In particular, it is provided here that the ratio of the carrier film thickness to the all-over varnish layer thickness lies in a range of from 1.8:1 to 7.0:1, preferably of from 2.5:1 to 5.8:1, wherein the carrier film 42 has a thickness in a range of from more than or equal to 3 μm to less than or equal to 7 μm and/or that the ratio of the carrier film thickness to the all-over varnish layer thickness in a range of from 4.1:1 to 10.0:1, preferably of from 4.4:1 to 8.3:1, wherein the carrier film 42 has a thickness in a range of from more than or equal to 7 μm to less than or equal to 10 μm.

Further, it is preferably provided that the all-over varnish layer in step b) has at least one detachment layer 43 and/or at least one protective varnish layer 44 and/or at least one decorative layer 45 and/or at least one primer layer 46 and/or at least one adhesive layer 47 and/or at least one color layer.

It is in particular also possible for at least one detachment layer 43 of the at least one detachment layers 43 and/or at least one protective varnish layer 44 of the at least one protective varnish layers 44 and/or at least one decorative layer 45 of the at least one decorative layers 45 and/or at least one primer layer 46 of the at least one primer layers and/or at least one adhesive layer 47 of the at least one adhesive layers 47 and/or at least one color layer of the at least one color layers to be applied by means of gravure printing and/or screen printing and/or relief printing and/or pad printing and/or inkjet printing and/or offset printing and/or flexographic printing and/or casting techniques.

It is in particular provided that in step b) the at least one adhesive layer 47 is applied as a hot glue, a thermoplastic adhesive, a cold glue, a radiation-curable adhesive, in particular an adhesive that can be cured by means of electromagnetic radiation and/or electron beam radiation and/or by means of UV radiation, or an oxidatively curing adhesive and/or a low-migration adhesive. It is further also possible for the adhesive layer 47 to be applied to a surface of the all-over varnish layer 41 at least partially.

It is in particular also possible for step b) further to comprise the following step and/or for the following step further to be carried out after step b):

c) applying at least one adhesive layer 47 of the at least one adhesive layers 47 such that at least one adhesive layer 47 of the at least one adhesive layers 47 covers at least one first region 21 of the all-over varnish layer 41 at least partially or over the whole surface and/or does not cover a second region 22 of the all-over varnish layer 41, in particular wherein at least one second region 22 of the at least one second regions 22 does not overlap at least one first region 21 of the at least one first regions 21 or overlaps it at least partially or over the whole surface.

In particular, it is also possible for at least one first region 21 of the at least one first regions 21 and/or at least one second region 22 of the at least one second regions 22 to comprise at least one of the following design elements or a combination of the following design elements: alphanumeric character, character, symbol, microprint, image, photo, logo, portrait, pictogram, pattern, in particular endless pattern, grid, in particular periodic grid, amplitude-modulated grid, dot grid, line grid, motif.

Figure 7:
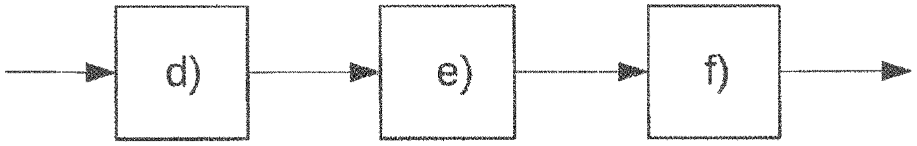
FIG. 7 shows a schematic representation of a method for decorating a target substrate

A method for decorating a target substrate 10 is represented schematically in FIG. 7, wherein the method comprises the following steps, which are carried out in particular in the following sequence:

d) providing a decorative foil 40, e) providing a target substrate 10, f) applying the decorative foil 40 to the target substrate 10.

Figure 8:
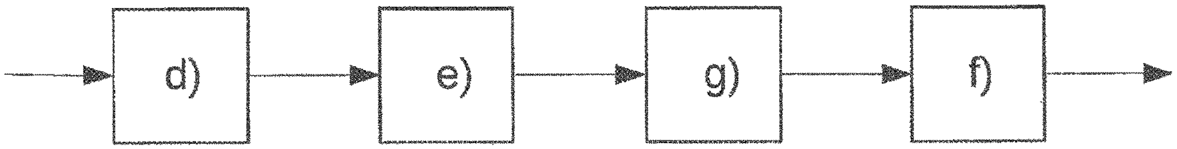
FIG. 8 shows a schematic representation of a method for decorating a target substrate

As represented schematically in FIG. 8, it is in particular also provided that the following step is carried out before step f):

g) applying at least one adhesive layer 47 to the decorative foil 40 such that at least one adhesive layer 47 of the at least one adhesive layers 47 covers at least one first region 21 of the all-over varnish layer 41 at least partially or over the whole surface and/or does not cover at least one second region 22 of the all-over varnish layer 41, in particular wherein at least one second region 22 of the at least one second regions 22 does not overlap at least one first region 21 of the at least one first regions 21 or overlaps it at least partially or over the whole surface, and/or applying at least one adhesive layer 47 to the target substrate 10 such that at least one adhesive layer 47 of the at least one adhesive layers 47 covers at least one third region 23 of the target substrate 10 at least partially or over the whole surface and/or does not cover at least one fourth region 24 of the target substrate 10, in particular wherein at least one fourth region 24 of the at least one fourth regions 24 does not overlap at least one third region 23 of the at least one third regions 23 or overlaps it at least partially or over the whole surface.

It is furthermore also provided that at least one first and/or third region 21, 23 of the at least one first and/or third regions 21, 23 and/or at least one second and/or fourth region 22, 24 of the at least one second and/or fourth regions 22, 24 comprises at least one of the following design elements or a combination of the following design elements: alphanumeric character, character, symbol, microprint, image, photo, logo, portrait, pictogram, pattern, in particular endless pattern, grid, in particular periodic grid, amplitude-modulated grid, dot grid, line grid, motif.

At least one adhesive layer 47 of the at least one adhesive layers 47 in step g) is preferably formed of a hot glue, a thermoplastic adhesive, a cold glue, a radiation-curable adhesive, in particular an adhesive that can be cured by means of electromagnetic radiation and/or electron beam radiation and/or by means of UV radiation, and/or an oxidatively curing adhesive and/or a low-migration adhesive.

It is further provided in particular that in step g) at least one adhesive layer 47 of the at least one adhesive layers 47 is applied by means of gravure printing and/or screen printing and/or relief printing and/or pad printing and/or inkjet printing and/or offset printing and/or flexographic printing and/or casting techniques.

It is also possible for at least one first and/or third region 21, 23 of the at least one first and/or third regions 21, 23, which is covered by the at least one adhesive layer 47 of the at least one adhesive layers 47 at least partially or over the whole surface, to be decorated by the all-over varnish layer 41.

Furthermore, it is advantageous if at least one color layer is applied to at least one surface of the all-over varnish layer 41 after step f), with the result that the adhesive force between at least one color layer of the at least one color layers and the all-over varnish layer 41 is at least 25 cN, preferably of at least 30 cN.

It is also advantageous if the all-over varnish layer 41 after step f) has a covering power of more than or equal to 99.5%, preferably of 100%, in the case of a decoration of a continuous solid surface and a decoration or point perception of more than or equal to 99.5%, preferably of 100%, in the case of a decoration of a 10% halftone area.

It is also preferably conceivable that the following step is further carried out in step f) and/or after step f):

h) pressing on the decorative foil 40 with at least one pressure stamp and/or at least one pressure roller.

Further, it is preferably also possible for at least one pressure stamp of the at least one pressure stamps and/or at least one pressure roller of the at least one pressure rollers in step h) to be designed as a heated planar and/or forming stamp and/or a heated roller, wherein this activates at least one adhesive layer 47 of the at least one adhesive layers 47 at least partially and/or in at least one first and/or third region 21, 23 of the at least one first and/or third regions 21, 23 and joins the decorative foil 40 to the target substrate 10.

It is in particular also possible for the following step further to be carried out after step f):

peeling the carrier film 42 off the all-over varnish layer 41, wherein the peel angle between the carrier film 42 and the all-over varnish layer 41 lies in a range of from 0° to 120°, preferably of from 0° to 90°.

When the carrier film 42 is peeled off the all-over varnish layer 41, it is provided in particular that at least one adhesive layer 47 of the at least one adhesive layers 47 is applied to at least one first and/or third region 21, 23 of the at least one and/or third regions 21, 23 and a decoration takes place in this region. In order that a decoration only takes place in the named region, the so-called cracking force must be overcome. The cracking force is the force which has to be overcome during the transfer to a surface area to be decorated or region to be decorated, in order that defined local breaks in the all-over varnish layer 41 of the decorative foil 40 occur and a sharp-edged decoration of the surface area to be decorated or region to be decorated is made possible.

The outer edge, in particular the front edge in the feed direction, of at least one adhesive layer 47 of the at least one adhesive layers 47 is called the cracking edge. It is provided in particular that the all-over varnish layer 41 breaks exactly and in a defined manner at this cracking edge, with the result that at least one adhesive layer 47 of the at least one adhesive layers 47, which is applied in at least one first and/or third region 21, 23 of the at least one first and/or third regions 21, 23, predefines the decoration.

The outer back edge, in the feed direction, of the adhesive layer 47 is called the tearing edge. It is provided in particular that the all-over varnish layer 41 breaks exactly and in a defined manner also at this tearing edge, with the result that at least one adhesive layer 47 of the at least one adhesive layers 47, which is applied in at least one first and/or third region 21, 23 of the at least one first and/or third regions 21, 23, predefines the decoration.

After the cracking of the all-over varnish layer 41 has taken place, the decoration of the surface area to be decorated or of the region to be decorated is effected by detachment of the all-over varnish layer 41 from the carrier film 42. The force required for this is called the tear-off force and it is as a rule smaller than the cracking force as the all-over varnish layer 41 does not need to be broken through. In general it is true that a small and homogeneous tear-off force over the entire region to be decorated guarantees a high covering power, and the number of decoration defects is reduced.

Figure 9A:
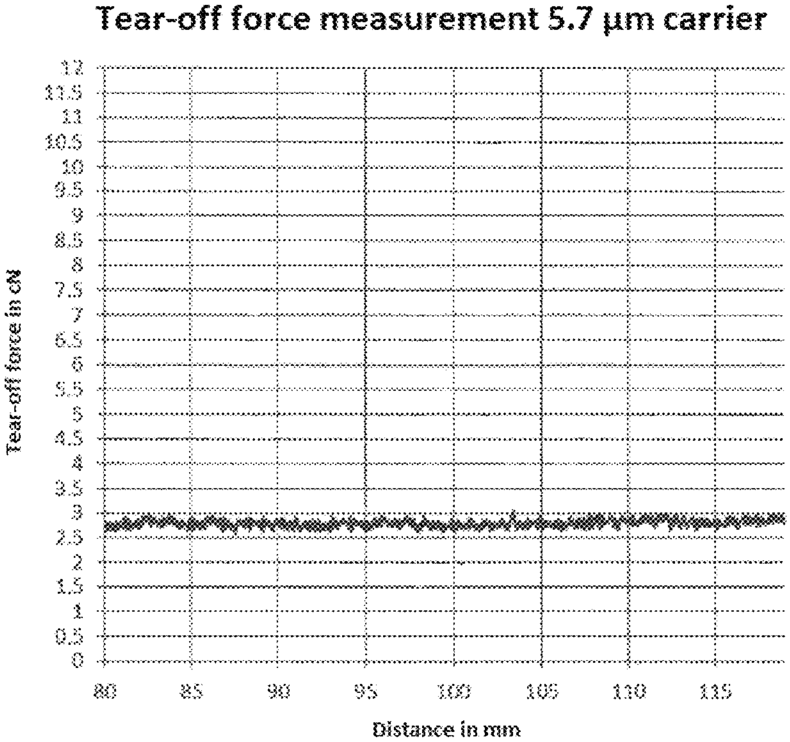
FIG. 9*a* shows the tear-off force measurement for a decorative foil with a carrier film thickness of 5.7 μm
Figure 9B:
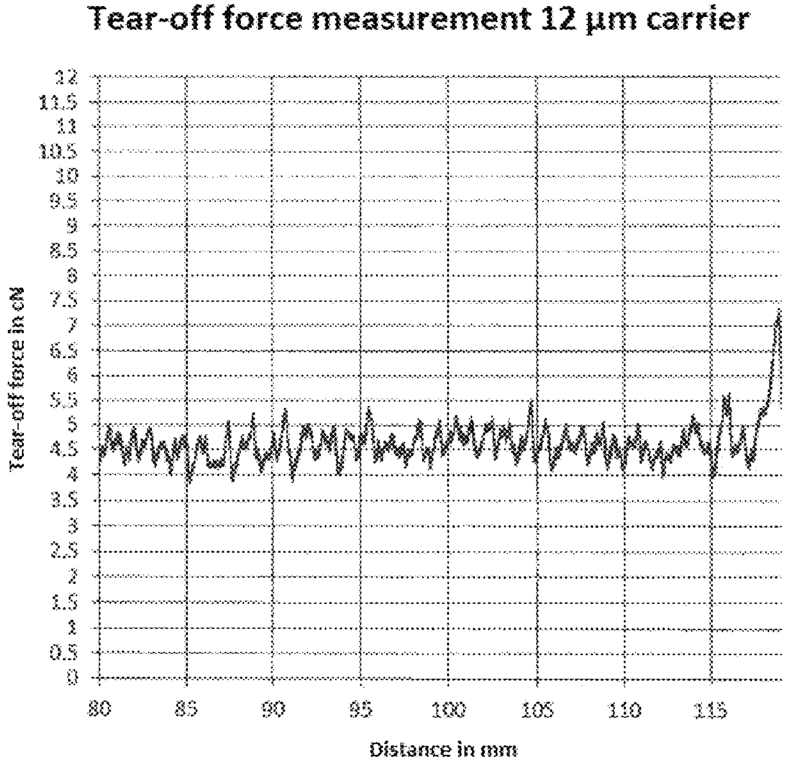
FIG. 9*b* shows the tear-off force measurement for a decorative foil with a carrier film thickness of 12 μm

By way of example, the force curves of the tear-off force for a decorative foil 40 according to the invention with a thickness of the carrier film 42 of 5.7 μm (FIG. 9*a*) and a decorative foil 40 according to the state of the art (FIG. 9*b*) with a thickness of the carrier film 42 of 12 μm are shown in FIGS. 9*a* and 9*b*, wherein the tear-off force is indicated in cN over the distance in mm. The two decorative foils 40 tested have identical layer structures and identical material compositions, except that the carrier film thicknesses are different.

A materials testing machine of the Z005 type from ZwickRoell GmbH & Co. KG was used to record the measured values. The carrier film 42 to be peeled off has a width of 13.5 mm and a length of 41 mm in both tests. The detachment of the carrier film 42 is effected in the longitudinal direction at a speed of 100 mm/min.

The average of the tear-off force for a decorative foil 40 with a carrier film thickness of 5.7 μm is approximately 2.75 cN (see FIG. 9*a*), whereas the average of the tear-off force for a decorative foil 40 with a carrier film thickness of 12 μm is approx. 4.5 cN (see FIG. 9*b*).

The fluctuations in the force amplitude, wherein by this is meant in particular the fluctuation in the tear-off force around its average, turn out to be smaller for a decorative foil 40 with a carrier film thickness of 5.7 μm (FIG. 9*a*) than for a decorative foil 40 with a carrier film thickness of 12 μm (FIG. 9*b*). The fluctuations in the force amplitude, regarded absolutely, are smaller than ±0.5 cN for a decorative foil 40 with a carrier film thickness of 5.7 μm, whereas fluctuations in the force amplitude of up to ±1 cN around the average occur in the case of a decorative foil 40 with a carrier film thickness of 12 μm.

Overall, it can thus be said both that the absolute tear-off force in the case of a decorative foil 40 with a carrier film thickness of 5.7 μm is smaller than in the case of a decorative foil 40 with a carrier film thickness of 12 μm and that the fluctuations in the force amplitude around its average are much smaller in the case of a decorative foil 40 with a carrier film thickness of 5.7 μm than in the case of a decorative foil 40 with a carrier film thickness of 12 μm. With a decorative foil 40 the carrier film 42 of which has a thickness in the range of from 3 μm to 10 μm, the tear-off force behaves particularly homogeneously, whereby an improved decoration and an improved covering power result.

A further series of tests proves the advantages set out above. Firstly, several similar target substrates 10 are prepared, wherein an adhesive layer 47 is applied to the target substrates 10 in a halftone area with 10% surface coverage, i.e. 10% of the surface area of the target substrate 10 is covered with adhesive dots. The 10% halftone area has a resolution of 100 Ipi (Ipi="lines per inch"), is amplitude-modulated and has an angulation of the grid dots of 45°.

To determine the maximum adhesive dots per target substrate 10, a target substrate 10 without decorative foil 40 is scanned in with a scanner with a resolution of 1,200 dpi and the number of adhesive dots is counted. The image forming is also called the adhesive image.

The same procedure is also carried out for decorated target substrates 10, wherein beforehand a target substrate 10 is decorated with a decorative foil 40 with a carrier film thickness of 5.7 μm (A) and a target substrate 10 is decorated with a decorative foil 40 with a carrier film thickness of 12 μm (B) and the carrier film 42 is detached from the all-over varnish layer 41 after the curing of the adhesive layer 47.

This process is likewise also carried out for several target substrates 10, in which the adhesive layer 47 is applied in a full-tone area, thus with a 100% surface coverage.

The result of this series of tests is represented in the following table:

| | 10% grid (number of decorated dots) | relative proportion (of 8240 determined dots from adhesive image) in % | covering power of the full-tone area in % |
|---|---|---|---|
| A (5.7 μm) | 8240 | 100 | 100 |
| B (12 μm) | 5116 | 62 | 99 |

Figure 10A:
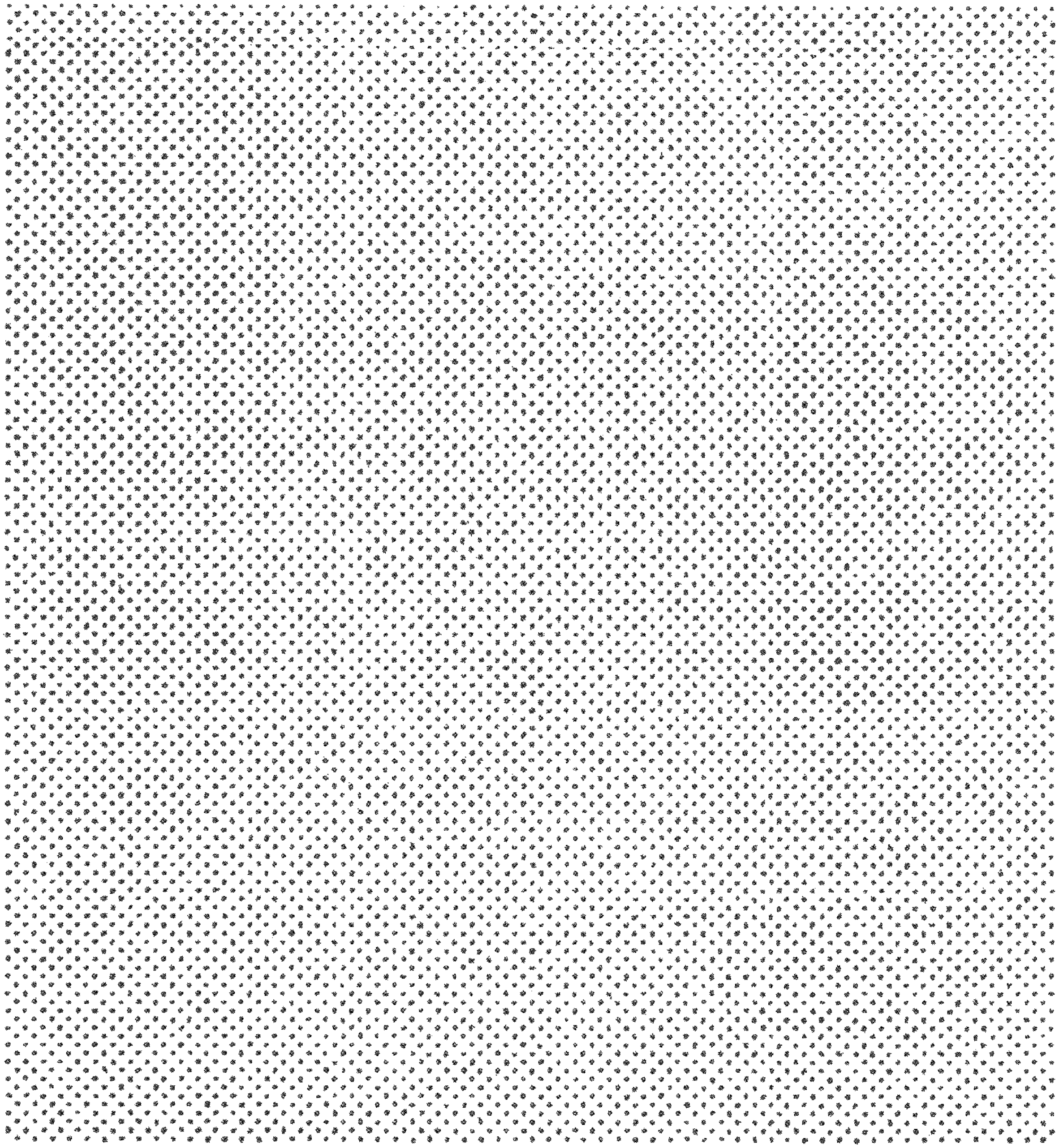
FIG. 10*a* shows the decorated 10% halftone area of a decorative foil with a carrier film thickness of 5.7 μm
Figure 10B:
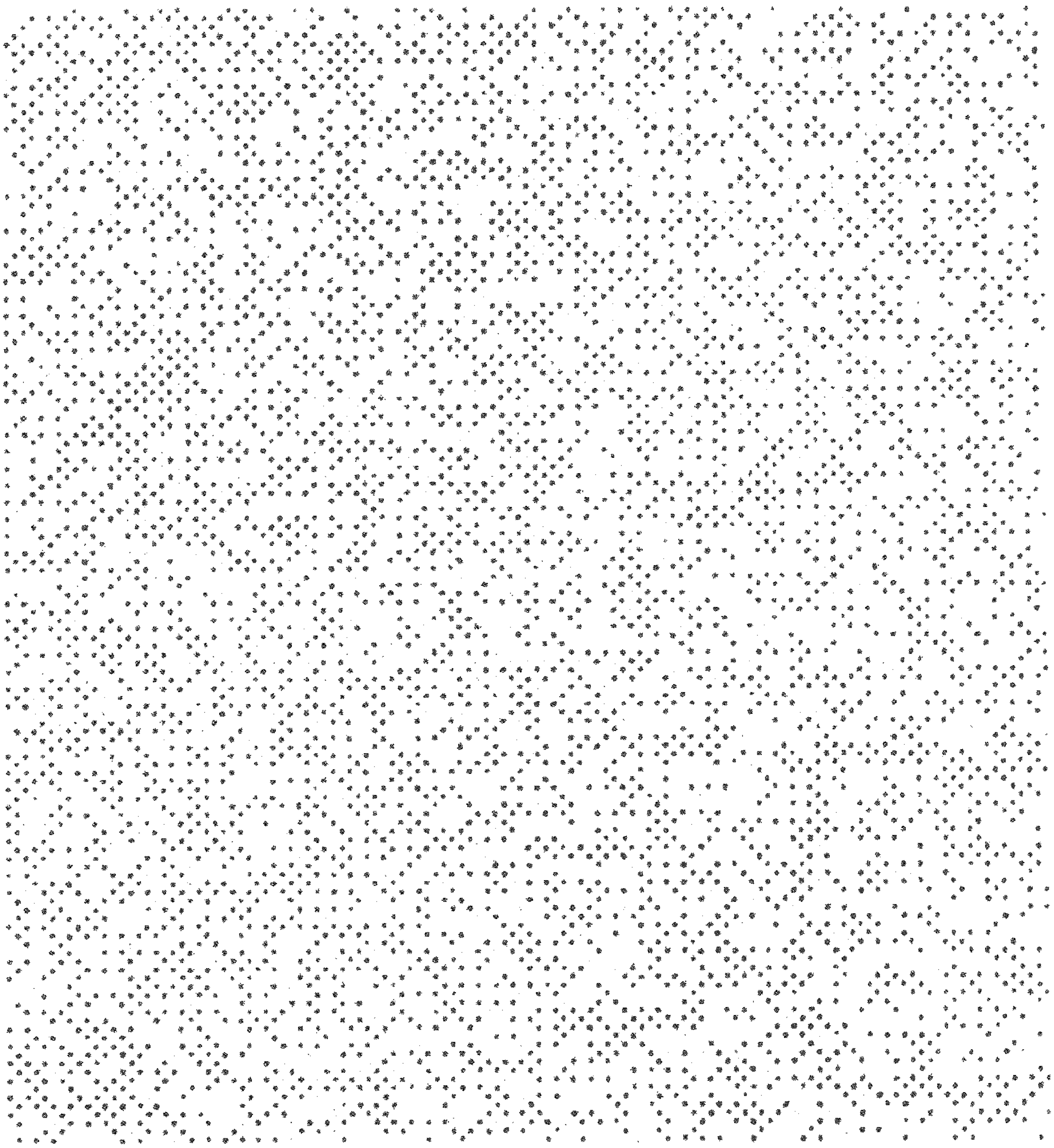
FIG. 10*b* shows the decorated 10% halftone area of a decorative foil with a carrier film thickness of 12 μm

In the 10% grid, all 8240 adhesive dots are decorated by a decorative foil 40 with a carrier film thickness of 5.7 μm; this is also represented in FIG. 10*a*. In contrast, merely only 62% of the adhesive dots are decorated with a decorative foil 40 with a carrier film thickness of 12 μm, as is also to be seen in FIG. 10*b*. Thus, for a decorative foil 40 with a carrier film thickness of 5.7 μm it can be said that there is a clean stamping or a high point perception, this is because 100% of the adhesive dots are decorated and thus the all-over varnish layer 41 optimally breaks at the cracking edge and/or at the tearing edge.

Further, a covering power of the full-tone area of 100% is achieved with a decorative foil 40 with a carrier film thickness of 5.7 μm, whereas a covering power of the full-tone area of 99% is achieved with a decorative foil 40 with a carrier film thickness of 12 μm.

The advantages of a clean stamping and a very high covering power therefore result for a decorative foil 40 with a carrier film thickness in the range of from 3 μm to 10 μm.

Figure 11A:
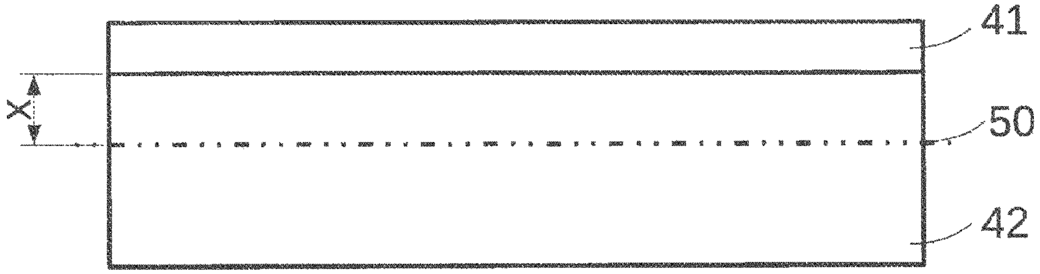
Figure 11B:
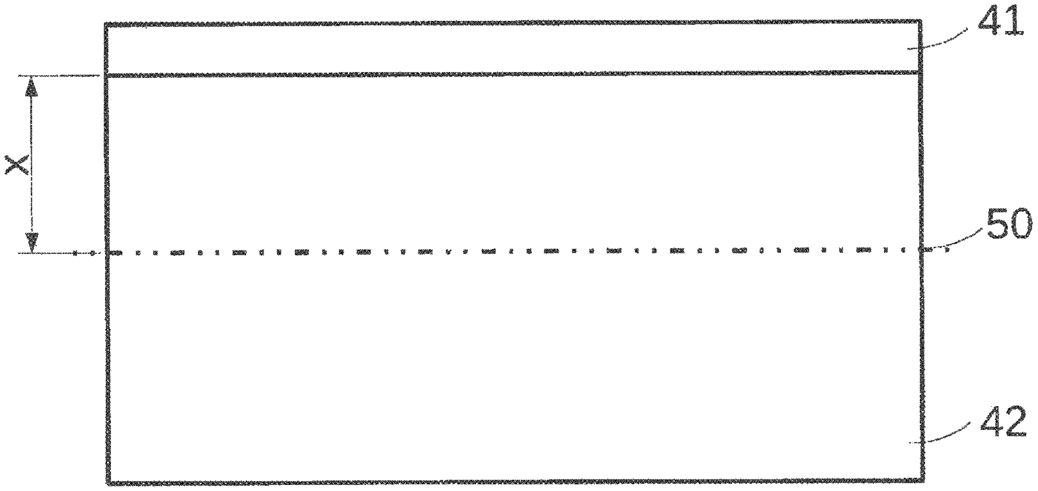

By way of explanation, FIGS. 11*a* and 11*b* are further mentioned, in which in each case a neutral fiber 50 is drawn in for a decorative foil 40 with a carrier film thickness of 5.7 μm (FIG. 11*a*) and for a decorative foil 40 with a carrier film thickness of 12 μm (FIG. 11*b*). The neutral fiber 50 runs along the geometric center plane or center line of the decorative foil 40. The neutral fiber 50 is the fiber the length of which does not change when twisted and/or bent, i.e. no tensile stresses or pressure stresses act on the neutral fiber 50. Further, the distance x from the neutral fiber to the all-over varnish layer 41 is represented. The smaller the carrier film thickness of the decorative foil 40, the smaller the distance x. With a shrinking distance x, the normal stress of the all-over varnish layer 41 as a result of bending is then also reduced. The reduced normal stress of the all-over varnish layer 41 in the case of a decorative foil 40 with a carrier film thickness in the range of from 3 μm to 10 μm ensures that undefined and/or random local breaks in the all-over varnish layer 41 do not already occur before the detachment of the carrier film. A clean stamping or a very high point perception can thus be achieved.

It is provided in particular that the tear-off force has fluctuations in the force amplitude around its average in a range of from more than or equal to −0.5 cN to less than or equal to 0.5 cN.

Further, it is preferably provided that the all-over varnish layer 41 has a covering power of more than or equal to 99.5%, preferably of 100%, in the case of a decoration of a continuous solid surface and a decoration or point perception of more than or equal to 99.5%, preferably of 100%, in the case of a decoration of a 10% halftone area.

It is possible in particular for the force for tearing the all-over varnish layer 41 off the carrier film 42 to lie in a range of from 2 cN to 8 cN.

LIST OF REFERENCE NUMBERS

10 target substrate
21 first region
22 second region
23 third region
24 fourth region
40 decorative foil
41 all-over varnish layer
42 carrier film
43 detachment layer
44 protective varnish layer
45 decorative layer
46 primer layer
47 adhesive layer
50 neutral fiber
x distance

The invention claimed is:

1. A decorative foil comprising a carrier film and an all-over varnish layer, wherein the carrier film has a thickness in the range of from 3.0 μm to 10.0 μm, and wherein a tear-off force between the carrier film and the all-over varnish layer has fluctuations in the force amplitude around its average in a range of from more than or equal to −0.5 cN to less than or equal to 0.5 cN.

2. The decorative foil according to claim 1, wherein the all-over varnish layer has a thickness in the range of from 1.0 μm to 2.5 μm.

3. The decorative foil according to claim 1, wherein the ratio of the carrier film thickness to the all-over varnish layer thickness lies in a range of from 1.8:1 to 7.0:1, wherein the carrier film has a thickness in a range of from more than or equal to 3 μm to less than or equal to 7 μm and/or wherein the ratio of the carrier film thickness to the all-over varnish layer thickness lies in a range of from 4.1:1 to 10.0:1, wherein the carrier film has a thickness in a range of from more than or equal to 7 μm to less than or equal to 10 μm.

4. The decorative foil according to claim 1, wherein the decorative foil has a transmissibility for UV radiation in the wavelength range of from 250 nm to 400 nm in the range of from 5% to 70%.

5. The decorative foil according to claim 1, wherein the all-over varnish layer comprises at least one detachment layer and/or at least one protective varnish layer and/or at least one decorative layer and/or at least one primer layer and/or at least one adhesive layer and/or at least one color layer.

6. The decorative foil according to claim 5, wherein at least one detachment layer of the at least one detachment layers comprises a material or a combination of materials selected from: waxes, silicones, polyurethanes and/or polymers.

7. The decorative foil according to claim 5, wherein at least one detachment layer of the at least one detachment layers has a thickness in the range of from 0.01 μm to 0.50 μm.

8. The decorative foil according to claim 5, wherein at least one detachment layer of the at least one detachment layers is formed transparent or translucent or opaque or dyed or at least partially dyed or crystal clear.

9. The decorative foil according to claim 5, wherein at least one protective varnish layer of the at least one protective varnish layer comprises a material or a combination of materials selected from: polymers.

10. The decorative foil according to claim 9, wherein the polymers of the at least one protective varnish layer of the at least one protective varnish layer have a molar mass in the range of from 1,000 g/mol to 100,000 g/mol.

11. The decorative foil according to claim 5, wherein at least one protective varnish layer of the at least one protective varnish layers has a thickness in the range of from 0.5 μm to 3 μm.

12. The decorative foil according to claim 5, wherein at least one protective varnish layer of the at least one protective varnish layers is formed transparent or translucent or opaque or dyed or at least partially dyed or crystal clear.

13. The decorative foil according to claim 5, wherein at least one decorative layer of the at least one decorative layers has at least one layer generating an optically variable effect.

14. The decorative foil according to claim 5, wherein at least one decorative layer of the at least one decorative layers has at least one replication varnish layer with a surface structure molded into at least one replication varnish layer of the at least one replication varnish layers.

15. The decorative foil according to claim 5, wherein at least one decorative layer of the at least one decorative layers has at least one reflective layer.

16. The decorative foil according to claim 5, wherein at least one decorative layer of the at least one decorative layers has at least one thin-film layer element for generating a color shift effect dependent on the viewing angle.

17. The decorative foil according to claim 5, wherein at least one decorative layer of the at least one decorative layers has at least one color layer formed patterned in the form of a second item of information.

18. The decorative foil according to claim 5, wherein at least one decorative layer of the at least one decorative layers comprises at least one metallic layer and/or at least one dielectric layer.

19. The decorative foil according to claim 18, wherein at least one metallic layer of the at least one metallic layers comprises a material or a combination of materials selected from: aluminum, silver, gold, copper, nickel, chromium and/or an alloy comprising at least two of these metals.

20. The decorative foil according to claim 18, wherein at least one dielectric layer of the at least one dielectric layers comprises a material or a combination of materials selected from: metal oxide, polymer, varnish and/or HRI material.

21. The decorative foil according to claim 5, wherein at least one decorative layer of the at least one decorative layers has a thickness in the range of from 8 nm to 500 nm.

22. The decorative foil according to claim 5, wherein at least one primer layer of the at least one primer layers has a thickness in the range of from 0.1 μm to 2 μm.

23. The decorative foil according to claim 5, wherein at least one primer layer of the at least one primer layers is formed transparent or translucent or opaque or dyed or at least partially dyed or crystal clear.

24. The decorative foil according to claim 1, wherein the force for tearing the all-over varnish layer off the carrier film lies in a range of from 2 cN to 8 cN.

25. A decorative foil comprising a carrier film and an all-over varnish layer, wherein the carrier film has a thickness in the range of from 3.0 μm to 10.0 μm, and wherein the all-over varnish layer has a covering power of more than or equal to 99.5%, in the case of a decoration of a continuous solid surface and a decoration or point perception of more than or equal to 99.5%, in the case of a decoration of a 10% halftone area.

* * * * *